C. J. E. WAXBOM.
CURRENT COLLECTING MECHANISM.
APPLICATION FILED FEB. 20, 1909.
1,027,090.
Patented May 21, 1912.
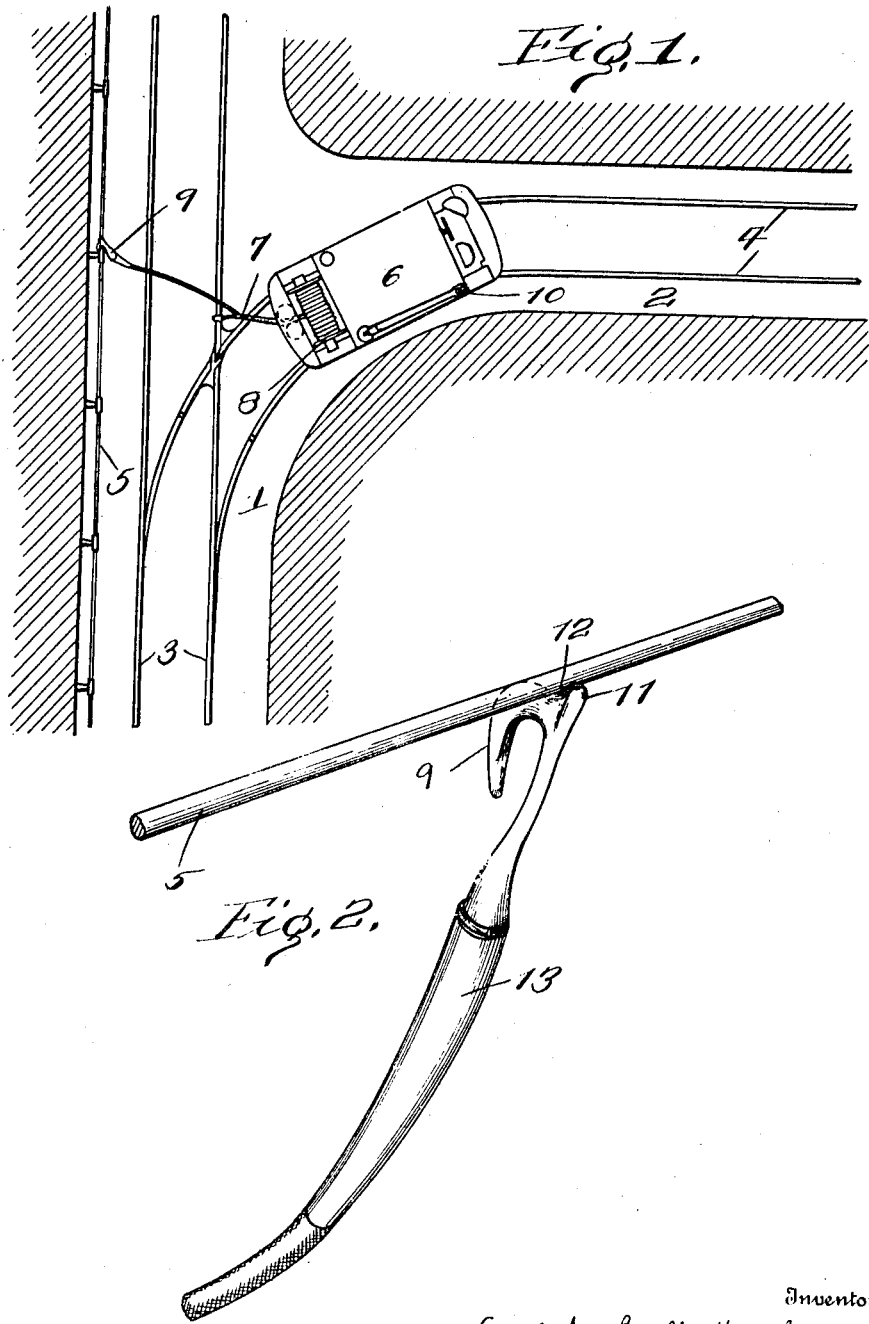
Witnesses
B. F. Brann
George R. Bliss.
Inventor
Carl J. Evald Waxbom
By H. H. Bliss,
Attorney

UNITED STATES PATENT OFFICE.

CARL J. EVALD WAXBOM, OF WESTERVILLE, OHIO, ASSIGNOR TO THE JEFFREY MANUFACTURING COMPANY, A CORPORATION OF OHIO.

CURRENT-COLLECTING MECHANISM.

1,027,090.   Specification of Letters Patent.   Patented May 21, 1912.

Application filed February 20, 1909. Serial No. 479,072.

*To all whom it may concern:*

Be it known that I, CARL J. EVALD WAXBOM, a citizen of the United States, residing at Westerville, in the county of Franklin and State of Ohio, have invented certain new and useful Improvements in Current-Collecting Mechanism, of which the following is a specification, reference being had therein to the accompanying drawing.

This invention relates to terminals for the flexible cables used upon mine locomotives of the gathering type, and has as its object to produce a hook which can be hung upon a trolley wire and which can be also used to make running contact with the underside of the trolley wire when held in suitable position by the motorman or trip-rider.

In the drawings—Figure 1 is a plan view of parts of a mine showing a locomotive approaching the principal entry and drawing current by means of its conductor cable. Fig. 2 is a detail perspective view of the cable terminal the hook being shown in engagement with the under side of a trolley wire.

Locomotives for gathering mine cars from the rooms into trains in the principal entries, which draw their current from fixed conductors by means of a flexible cable wound upon a reel carried by the locomotive, are well known and commonly used in mines at the present time. When the locomotive is about to leave a principal entry to run down a side entry and into the rooms where the coal or other material is being mined, the outer end of the cable is secured to the trolley wire in the entry. The current flows from the trolley wire to the cable, through it to the locomotive motors, and finds its way back to the generator either through the locomotive wheels and a ground return or by means of a second conductor in the cable, which second conductor is connected at its outer end to the rails in the entry, the rails constituting the return path.

In Fig. 1 of the drawings are shown a principal entry 1 and a side entry 2, the tracks 3 in the principal entry and 4 in the side entry, the trolley wire 5, the gathering locomotive 6 and the conductor cable 7. This cable is wound at one end upon the reel 8 and at the other end is provided with a hook 9 which is hung upon the trolley wire 5.

When it is desired to run the locomotive from the position shown in Fig. 1 to a position in the principal entry it is frequently found impossible under some conditions of use to run the locomotive sufficiently into the principal entry to make contact between the trolley wheel 10 and the trolley wire 5 while the hook is hung upon the trolley wire. The hook shown in the drawings is especially adapted to meet this difficulty. When the locomotive has been moved as far out toward the tracks 3 as is possible with the hook still in engagement with the trolley wire, the hook is disengaged and is held in contact with the underside of the trolley wire by the trip-rider or, if it is possible to do so, by the motorman, and as the locomotive is propelled past the turn-out, the hook is held in sliding contact with the trolley wire until the locomotive reaches such a position that the trolley pole can be brought into position for the wheel to engage the wire.

To make it possible to hold the hook thus in running contact with the wire, a small projecting thumb or lug 11 is formed upon the outer part of the hook by which the concave recess 12 is provided to receive the trolley wire and to prevent the hook from being displaced laterally of the trolley wire as it is pressed upwardly. It will be understood that not only is this outside sliding engagement easier to effect than would be a sliding engagement of the inside surface of the hook with the trolley wire; but it is also to be noted that the wire supporting devices would interfere with such an over-running contact.

The end of the cable is provided with a heavy insulating hose 13 which serves as a handle for the operator by which he can hold the hook in contact with the trolley wire without danger of shock, and which also stiffens that part of the cable adjacent the hook. This stiffening is of course necessary to enable the hook to be held firmly in position.

What I claim is:

1. A current collecting terminal for a reeled conductor cable comprising a conductor hook secured to the free end of the cable, the hook having a thumb projecting from its outside surface adapted to enable the hook to be pressed upward against a trolley wire without lateral displacement of the hook.

2. A current collecting terminal for a reeled conductor cable comprising a conductor hook secured to the free end of the cable, the hook being formed to present a concavity in its outer surface adapted to engage a trolley wire from below and prevent lateral displacement of the hook with respect to the trolley wire.

3. A current collecting terminal for a reeled conductor cable comprising a conductor hook secured to the free end of the cable, and a flexible cable stiffening reinforcement wrapped about the cable adjacent the hook and serving to support the hook.

4. A current collecting terminal for a reeled conductor cable, comprising a conductor hook secured to the free end of the cable, the hook being formed to present a concavity in its outer surface adapted to engage a trolley wire from below and prevent lateral displacement of the hook with respect to the trolley wire, and an insulating and stiffening hose encircling the cable adjacent said hook.

5. A manually operable, sliding-contact, current collecting terminal for a reeled conductor cable, comprising a conductor hook secured to the free end of the cable, and a flexible insulating and stiffening hose encircling the cable adjacent said hook and serving to support the hook.

In testimony whereof I affix my signature, in presence of two witnesses.

CARL J. EVALD WAXBOM.

Witnesses:
W. R. YOUMANS,
E. L. HOPKINS.